United States Patent [19]
Jones et al.

[11] 3,857,599
[45] Dec. 31, 1974

[54] GRIPPER DEVICE

[75] Inventors: Thomas Alan Jones, Bolton; Andrew James Anthony, Tariffville, both of Conn.

[73] Assignee: Combustion Engineering, Inc., Windsor, Conn.

[22] Filed: Dec. 1, 1972

[21] Appl. No.: 311,186

[52] U.S. Cl. ............. 294/90, 176/36 C, 176/86 R, 294/86 A, 294/86.3
[51] Int. Cl. ..................... G21c 19/10, E21b 31/02
[58] Field of Search .................. 294/90, 86 A, 86.1, 294/86.26–86.33, 99; 24/263 D, 263 DF, 24/263 DH; 176/36 R, 36 C, 86 R

[56] References Cited
UNITED STATES PATENTS

| | | | |
|---|---|---|---|
| 2,687,323 | 8/1954 | Stohn | 294/86.31 X |
| 2,969,845 | 1/1961 | Hester | 24/263 D |
| 3,275,368 | 9/1966 | Plunk | 294/86.3 |
| 3,604,746 | 9/1971 | Notari | 294/90 |

Primary Examiner—Evon C. Blunk
Assistant Examiner—Johnny D. Cherry
Attorney, Agent, or Firm—John R. Nelson

[57] ABSTRACT

A gripper device having longitudinally extending gripping means which are movable into and out of gripping engagement and a gripper operating member which is relatively longitudinally movable between first and second positions relative to the gripping means. The gripping means has defined along its length mutually opposed, longitudinally spaced, upper and lower gripping surfaces. These gripping surfaces are each obliquely disposed relative to the longitudinal direction and are the sole engaging surfaces of the gripping means. When the gripper operating member is in the first position, the member continuously applies an obliquely oriented force relative to the gripping means to force the gripping means into gripping engagement and when the gripper operating member is in the second position, the obliquely oriented force is released. Also, means are disclosed for locking the gripper operating member in the first position.

13 Claims, 12 Drawing Figures

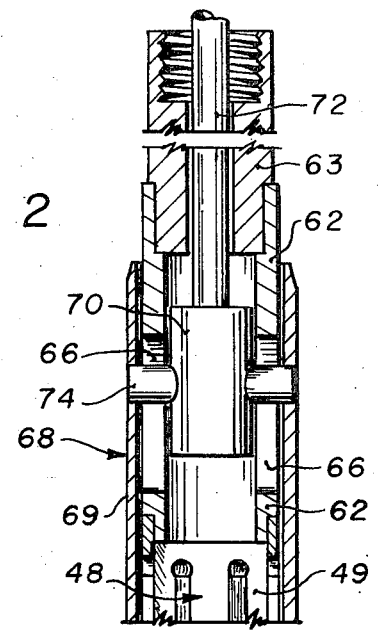
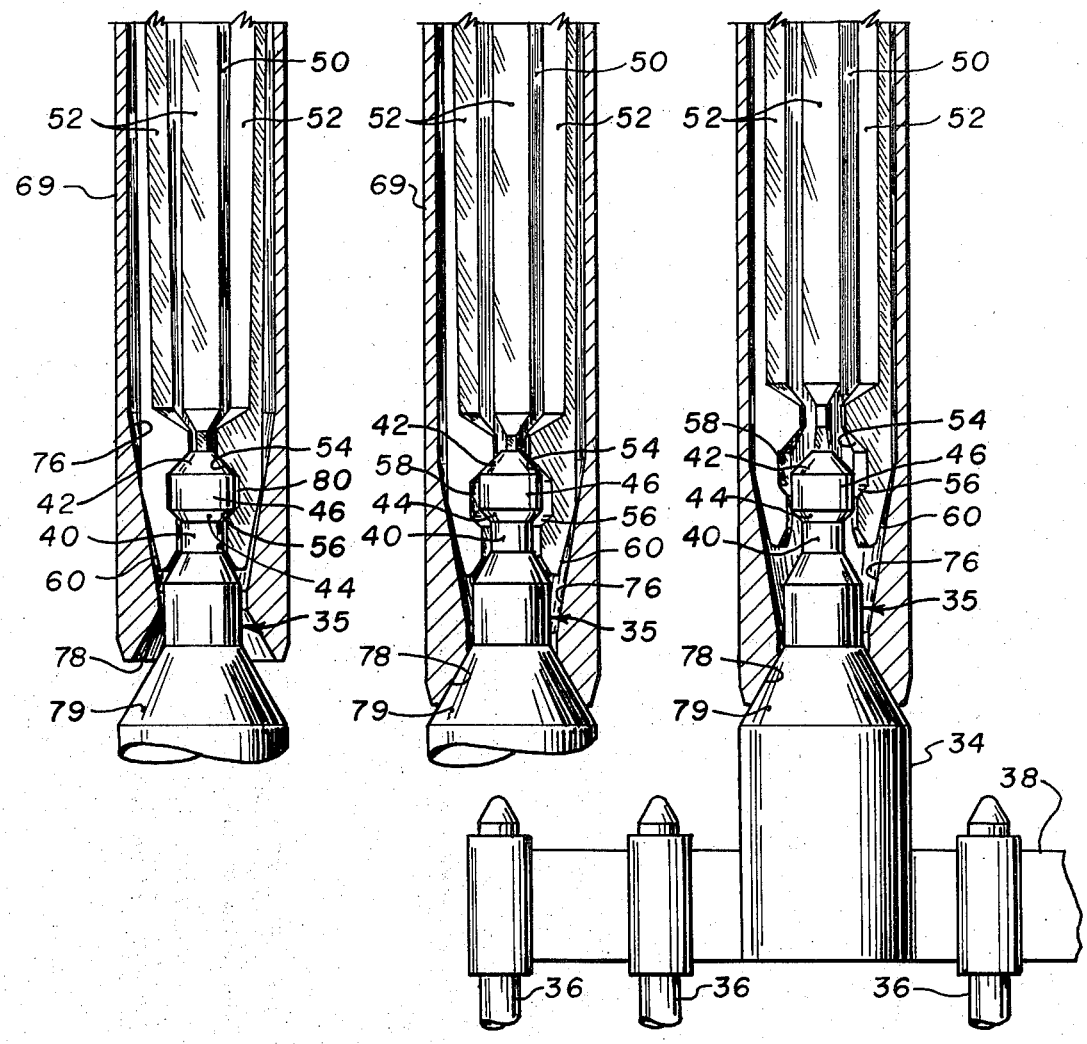
FIG. 2
FIG. 4   FIG. 3

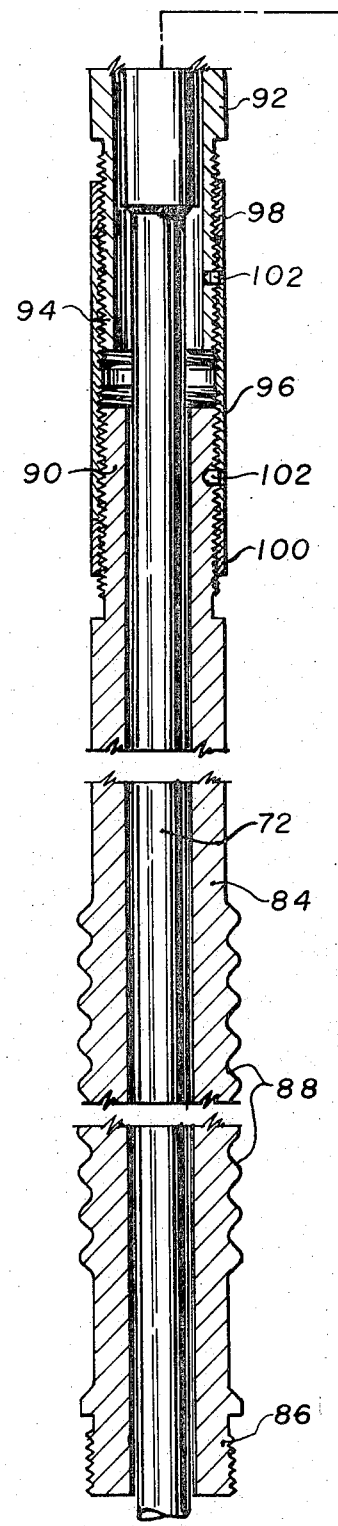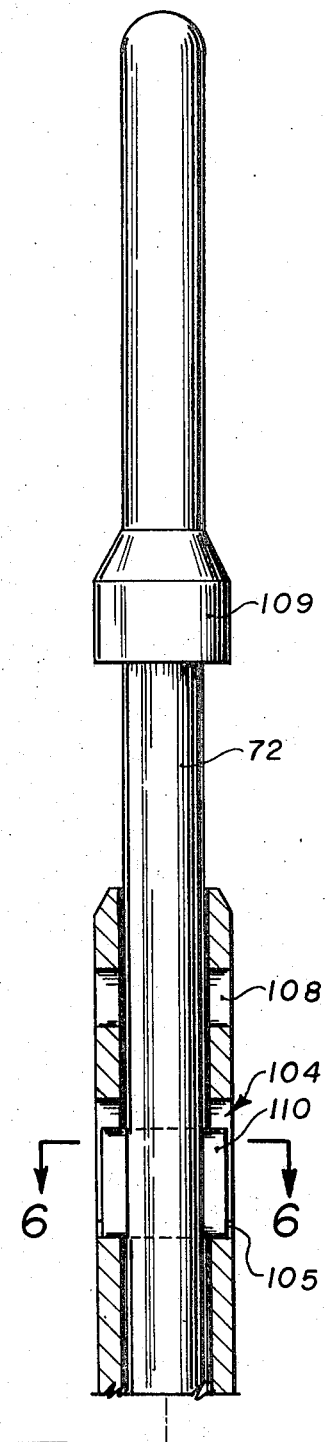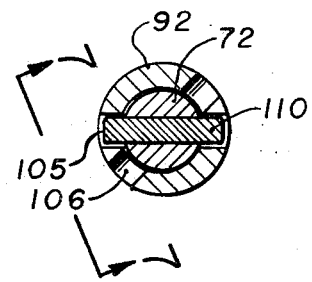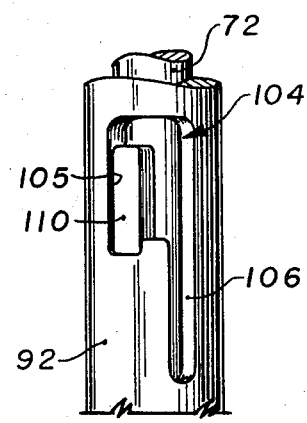
FIG. 5
FIG. 6
FIG. 7

GRIPPER DEVICE

BACKGROUND OF THE INVENTION

In the operation and maintenance of nuclear reactors it is necessary to remove the fuel assemblies at predetermined intervals and to refuel the reactor. This requires that the head of the reactor vessel be removed together with control element drive mechanisms which are mounted thereon to expose the fuel assemblies and control element asseblies situated therewithin. These control element assemblies extend upwardly above the fuel assemblies and are adapted to be connected to the control element drive mechanisms. It is often necessary to provide a means for disconnecting the control elements from the remainder of the control element assembly. This is to allow the control elements to remain fully inserted in the core when the head and other reactor hardware positioned above the fuel assemblies are removed during the refueling operation. Also this disconnecting means permits the reshuffling of the control element location relative to the remainder of the control element assemblies which are connected to the fixed drive means mounted on the head.

It is a requirement, especially with magnetic jack control element drive mechanisms, that the disconnecting means rigidly retain the control elements from vertical and horizontal movement during operation and during induced impact loads. Furthermore, it is desirable to have a tight fitting disconnecting means in order to prevent excessive wear during the numerous refueling operations which occur during the life of the reactor.

SUMMARY OF THE INVENTION

Accordingly, the present invention is directed to control element drive assemblies incorporating readily operable means for remotely gripping and releasing the control elements from the drive assemblies. The gripper device for accomplishing this is particularly adaptable for rigidly retaining the control elements from vertical and horizontal movement during operation of the drive mechanisms. The gripper device comprises longitudinally extending gripping means which are movable into and out of gripping engagement with the control element assemblies. The gripping means has defined along its length mutually opposed, longitudinally spaced, upper and lower gripping surfaces. These upper and lower gripping surfaces are each obliquely disposed relative to the longitudinal direction and are the sole surfaces of the gripping means to engage the control element assembly. The gripping means are supported by a gripper support member which is connected to the drive assembly. A gripper operating member is provided which is relatively longitudinally movable between a first position and a second position relative to the gripping means. When the gripper operating member is in the first position, the member continuously applies an obliquely oriented force relative to the gripping means to force the gripping means into gripping engagement with the control element assembly in order to provide a rigid connection with the drive assemblies. When the gripper operating member is in the second position, the obliquely oriented force is released. Means are provided for moving the gripper operating member between the first and second position and means are also provided for locking the gripper operating member in the first position.

Since the sole engaging surfaces of the gripping means are mutually opposed, longitudinally spaced and obliquely disposed relative to the longitudinal direction, and since the gripping means are moved into gripping engagement and held thereinplace by a member which continuously applies an obliquely oriented force, the gripper device assures that the control element assembly will be rigidly retained from vertical and horizontal movement when it is gripped. This arrangement of gripper device is in contrast to prior art grippper devices wherein gripping means are usually held in gripping engagement by a member which, at the most, only applies a force in a direction perpendicular to the longitudinal direction. Accordingly, if the longitudinal direction coincides with the vertical direction, the control element assembly will not be retained against vertical movement relative to the gripping device.

BRIEF DESCRIPTION OF THE DRAWINGS

FIG. 2 is an elevational view partially in section of the lower half of the gripper device and control element assembly illustrating the gripper in an unlatched position.

FIG. 3 is a view similar to a portion of that shown in FIG. 2 wherein the gripper device is being moved into gripping engagement with the control element assembly.

FIG. 4 is a view similar to FIG. 3 wherein the gripper device is in gripping engagement with the control element assembly.

FIG. 5 is an elevational view partially in section of the upper half of the gripper device.

FIG. 6 is a cross sectional view taken along line 6—6 of FIG. 5.

FIG. 7 is a side view taken along line 7—7 of FIG. 6.

DESCRIPTION OF THE PREFERRED EMBODIMENT

Figure 1:
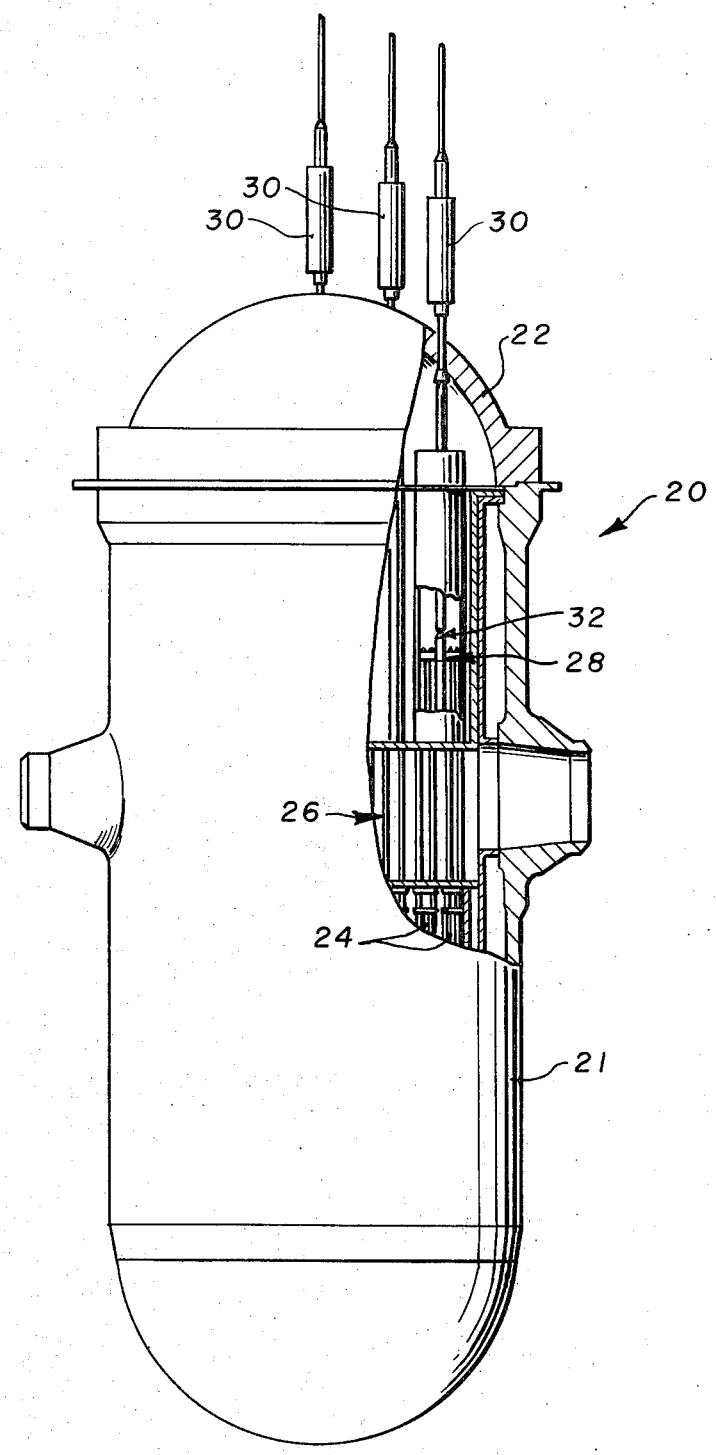
FIG. 1 is an elevational view partially broken away illustrating a nuclear reactor incorporating the present invention.

Referring first to FIG. 1, there is illustrated generally a nuclear reactor 20 having a vessel 21 and vessel head 22. The vessel 21 contains a plurality of fuel assemblies 24 which form the core of the reactor and into which extend a plurality of control element assemblies 28 which control the nuclear reaction in order to insure safe operation of the reactor. The vertically movable control element assemblies 28 are guided into and out of the core by a guide structure 26 which is of the type generally described in patent application Ser. No. 266,858 filed June 28, 1972 by Frank Bevilacqua and entitled "Guide Structure for Control Elements." Basically, the guide structure 26 comprises two spaced tube sheets 112, 114 interconnected by a plurality of longitudinally extending hollow tubes 116. The control element fingers 36 of the assemblies 28 extend into and through the tubes 116 and are supported by yokes 38 which are vertically movable above the upper tube sheet 112. A plurality of coupling or gripper devices 32, one of which is shown generally in FIG. 1, couple the control element assemblies 28 to the plurality of drive assemblies 30 mounted on the head 22 of the reactor vessel 21 in order that the drive assemblies 30 can drive the control element assemblies 28 vertically into and out of the reactor core. The drive assemblies 30 may be any of the well known types such as rack and pinion or magnetic jack drives which are employed in nuclear reactor operation.

It should be noted that during the refueling operation of the reactor arrangement as shown in FIG. 1, the control element assemblies 28 will necessarily have to be withdrawn with the guide structure 26 from the reactor vessel 21 in order to expose the fuel assemblies 24. This can be done without any danger of the reactor going "critical" so long as means are provided for injecting and flooding the reactor core and vessel with a poison solution such as highly borated water which takes the place of the poison in the control element assemblies 28. This procedure of refueling has been noted in patent application Ser. No. 266,858 referred to hereinabove. Even with this type of refueling operation in which the control element assemblies are retained within the guide structure 26 it is necessary to provide a means for disconnecting the gripper devices 32 from the control element assemblies 28.

As can be appreciated in viewing FIG. 1, the longitudinal length of the coupling devices 32 must be varied depending upon the radial location of the devices within the reactor. Oftentimes, the poison strength and number of control element fingers 36 per control element assembly 28 are varied throughout the core and it may occasionally be necessary to change the radial location of different control element assemblies 28 within the reactor. Accordingly, even with the type of refueling operation described above, it is necessary to provide a means for disconnecting or uncoupling the coupling devices 32 from their control element assemblies 28.

In order to provide such a means, there is disclosed a novel gripper device 32 which acts to rigidly retain the control element assemblies 28 against vertical and horizontal movement when the gripper device is in gripping engagement, and which is easily accessible and remotely operable to release the control element assemblies 28 therefrom when so desired. This novel gripper arrangement, which is particularly adaptable for use with the reactor arrangement of FIG. 1, is shown in FIGS. 2-7. Referring first to FIG. 2, there is shown the lower portion of the gripper 32 in an unlatched relationship with the upper portion of a typical control element assembly 28. The control element assembly 28 is comprised of a plurality of longitudinally extending, laterally spaced control rods or fingers 36 supported by a yoke 38 having an upwardly extending connecting member 34. The connecting member 34 terminates at its upper end in a coupling member or head 35 having a reduced neck portion 40, oppositely facing upper and lower engagement faces 42, 44 each of which is obliquely disposed relative to the longitudinal axis of the coupling head, and a cylindrical surface 46 longitudinally spacing the upper and lower engagement faces 42, 44. The gripper device 32 comprises a longitudinally extending gripping means 48 and a gripper operating member 68. The gripping means 48 is a tubular cylinder 49 which is axially aligned with the longitudinal axis of the coupling head 35 and which has a plurality of longitudinal slots 50 therein so as to form a plurality of gripping fingers 52. In the embodiment shown in FIGS. 2, 3 and 4 there are six slots which divide the cylinder 49 into six gripping fingers 52. Each of the fingers 52 at its lower end is provided on its inner surface with mutually opposed and longitudinally spaced upper and lower gripping surfaces 54 and 56, the two surfaces being longitudinally separated by surface 58. The upper and lower gripping surfaces 54 and 56 are each obliquely disposed relative to the longitudinal direction of the tubular member 49 and provide the sole gripping surfaces which engage the coupling head 35 of the control element assembly 28. The tubular cylinder 49 is rigidly connected at its upper end to an intermediate support member 62 which in turn is connected at its upper end to a tubular support member 63. The inner surface of the upper end of the tubular support member 63 is threaded for a purpose to be described hereinbelow.

The gripper operating member 68 is a tubular sleeve 69 which surrounds and is coaxially aligned with the tubular cylinder 49. The sleeve 69 extends longitudinally downward past the lower end of the tubular cylinder 49 and is provided at the lower end with a cam surface 76. The cam surface 76 is an obliquely disposed upwardly facing shoulder defined on the inner surface of the sleeve 69 between an upper portion having an inner diameter larger than the outer diameter of the tubular cylinder 49 and a lower portion having an inner diameter smaller than the outer diameter of the cylinder 49. Upon longitudinal movement upward of the tubular sleeve 69 relative to the tubular cylinder 49, the cam surface 76 will engage cam faces 60 defined on the outer surface of the gripping fingers 52 so as to force the gripping fingers 52 inwardly. At its lowermost tip the sleeve 69 is provided with an obliquely disposed downwardly facing shoulder which forms a disengaging cam surface 78. Upon longitudinal movement downward of the sleeve 69 relative to the cylinder 49 the disengaging cam surface 78 will engage a complementary cam face 79 on the connecting member 34 to force the control element assembly coupling head 35 out of the grasp of the gripping flexible fingers 52.

Longitudinal movement of the gripper operating member 68 is accomplished by means of a rod 72 which is longitudinally movable within the support member 63. The lower end of the rod 72 has affixed thereto a plunger 70 which is longitudinally slidable within the tubular intermediate member 62. The tubular intermediate member 62 is provided with two diametrically opposed longitudinal slots 66 through which extends a pin 74 which is fixed to the plunger 70 and the tubular sleeve 69. Accordingly, longitudinal movement of the rod 72 will impart longitudinal movement of the sleeve 69, the limits of this movement being governed by the height of the slots 66 in the tubular intermediate member 62.

The operation of the gripper device to effect gripping engagement of the fingers 52 with the coupling head 35 is as follows. Initially, the sleeve 69 is in its lowermost position relative to the tubular cylinder 49. The gripper device 32 is lowered until the disengaging cam surface 78 of the sleeve 69 engages the complementary cam face 79 of the control element assembly head 35. Next, the tubular cylinder 49 is moved longitudinally downward by movement of the tubular support member 63 in a manner to be described hereinbelow until the upper gripping surfaces 54 of the flexible fingers 52 engage the upper engagement face 44 of the coupling head 35. This position is shown in FIG. 3. A continuous upward force is then exerted on the rod 72 and correspondingly on the sleeve 69 so that the cam surface 76 continuously imparts an obliquely oriented force to the flexible fingers 52. This obliquely oriented force causes the upper and lower gripping surfaces 54 and 56 to engage the engagement faces 44 and 42 respectively of the coupling head 35. As can be seen in FIG. 4, a gap 80 is provided between the separation surfaces 58 of the gripping fingers 52 and 46 of the coupling head 35 to insure that the control element assembly 28 will be restrained against any vertical and horizontal movement relative to the gripping fingers 52.

Referring now to FIGS. 5, 6 and 7 there is shown a tubular member 84 which has a threaded lower end 86 which is threadedly connected to the upper end of the support cylinder 63. Convolutions or teeth 88 are provided on the outer surface of the tube 84 for engagement with lifting lugs (not shown) in the drive assemblies 30 so that the tube 84, and in turn the support element 63 and control element assembly 28, may be moved vertically into and out of the reactor core. A second tubular member 92 is connected to the upper end of the tubular member 84 by means of a sleeve 96. The sleeve 96 is provided with oppositely threaded ends which correspond to the oppositely threaded ends 90 and 94 of the two cylindrical tubes 84 and 92 respectively so that rotation of the sleeve 96 in one direction will cause the ends of the two tubes 84 and 92 to be drawn together while rotation of the sleeve in the opposite direction will cause the two tubes to be moved apart. In this way the longitudinal or elevational position of the upper tube can be accurately set with respect to the lower tube 84. Once the relative positions are set, the sleeve 96 is fixed in place by pins 102 and lock nuts 98 and 100 to rigidly maintain the relative positions of the two tubes 92 and 84.

The rod 72 extends upwardly into and through the cylindrical supporting tubes 63, 84 and 92. The upper end of the tube 92 is provided with two diametrically opposed slots 104 which can best be seen in FIG. 7. The slots 104 each have a longitudinal shank portion 106 and a hooked return portion 105 positioned at the upper end of the shank portion 106. The rod 72 is provided with a generally rectangular pin 110 which extends through the rod 72 and into the slots 104 and which is movable therewithin between the hooked return portion 105 and the longitudinal shank portion 106. This pin and slot arrangement provides the necessary locking force for locking the gripper operating member 68 in its upper position relative to the longitudinally extending gripping means 48. The operation of this mechanism is as follows. When the pin 110 is in the longitudinal shank portion 106 of the slot 104, the gripper operating sleeve 69 is free for longitudinal movement relative to the flexible fingers 52. In order to move the flexible fingers 52 into gripping engagement with the coupling head of the control element assemblies 28, the rod 72 is pulled upward, with the pin 110 in the longitudinal portion 106, until the flexible fingers 52 tightly engage the coupling head 35. The longitudinal elevation of the lower end of the pin 110 at this position is slightly below the longitudinal elevation of the lower end of the hooked return portion 105 of the slot 104. The rod 72 is then placed in tension by stretching and the rod 72 is rotated (clockwise as seen in FIG. 6) so that the pin 110 falls into the hooked return portion 105 of the slot 104. When the pin 110 is in the hooked return portion 105 the rod is still in tension since the vertical elevation of the pin 110 is still above the longitudinal elevation when the flexible fingers 52 are first moved into tight gripping engagement. In this manner an obliquely oriented force is continuously applied to the cam faces 60 of the flexible fingers 52 to insure that tight gripping engagement is maintained.

It will be appreciated that in order not to stretch the rod 72 past its elastic limit the relative longitudinal positions of the hooked return portion 105 of the slot 104 and the pin 110 is critical. This is the reason why an oppositely threaded sleeve 96 is used to set the elevational position of the upper tube 92 relative to the lower tube 84 and the pin 110 on the rod 72.

In order to insure that the pin 110 does not accidentally come out of the hooked return portion 105 of the slot 104, the rod 72 is generally placed in torsion by rotating the upper end of the rod 72 relative to its lower end. The amount of torsion in the rod 72 is less when the pin 110 is in the hooked return portion 105 than when the pin 110 is in the longitudinal shank portion 106 so that it is necessary to increase the torsion in the rod 72 to move the pin into the longitudinal shank 106 and thereby release the obliquely oriented force on the flexible fingers 52.

In order to accomplish this stretching and rotation of the rod 72, a tool is provided (not shown) which engages holes 108 in the tube 92 and which engages a block 109 on the rod 72. By operating this tool, relative movement of the rod 72 and the tube 92 can be accomplished in any well known manner.

Figure 8:
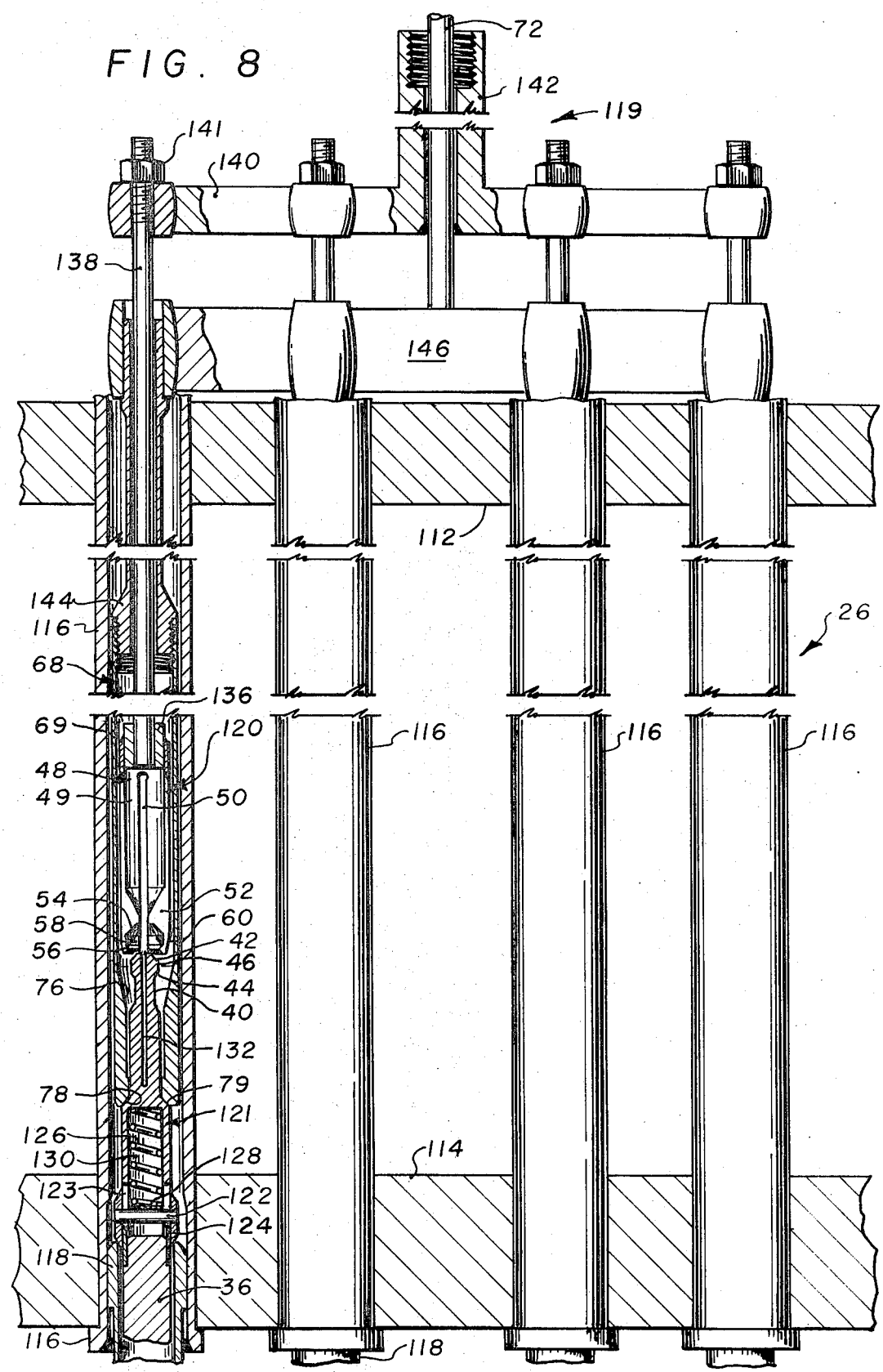
FIG. 8 is an elevational view partially in section of an alternative arrangement of the gripper device wherein the control element fingers of each control element assembly are individually gripped by gripper devices, a gripper device being shown in the unlatched position.
Figure 9:
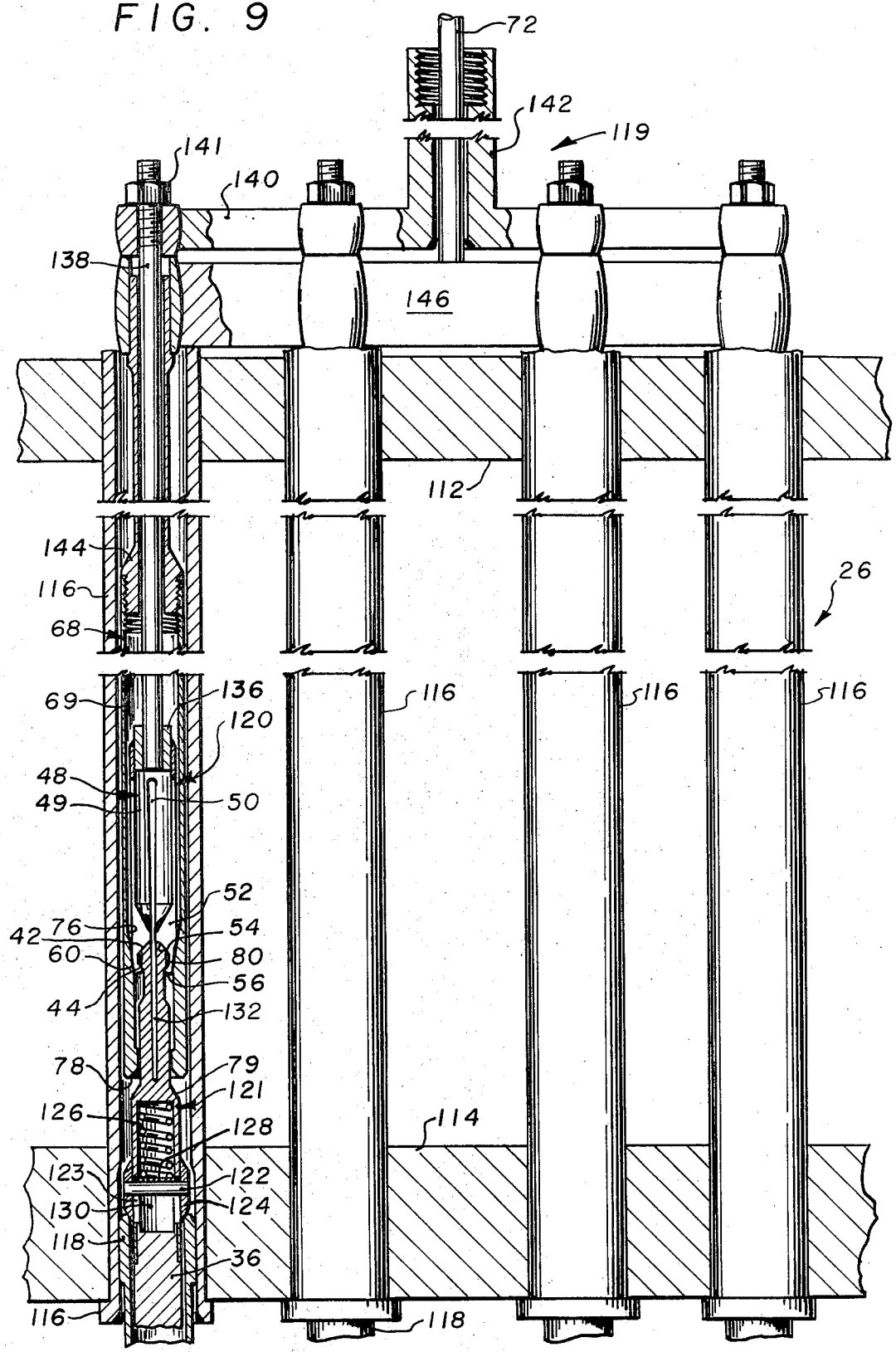
FIG. 9 is a view similar to FIG. 8 wherein the gripper device is in the latched position.

As previously noted hereinabove, it is possible to remove all of the control element assemblies 28 from a reactor during the refueling operation if some other type of poison is used in place of that in the control elements 36. However, if it is not possible to provide an adequate poison substitute in a reactor utilizing the guide structure 26 depicted in FIG. 1, then it is necessary to provide a gripping device which grips each of the control rods 36 individually. Such an arrangement, which utilizes the gripper device concept as previously described, is shown in FIGS. 8 and 9. The fuel assemblies 24 are provided with upwardly extending posts 118 which fit into the lower extensions of the tubes 116 of the guide structure 26. These posts 118 and tubes 116 are hollow and receive the control rods 36 of the control element assemblies 28.

FIG. 8 shows generally a master gripper device 119 which has eight individual gripper devices 120 which operate to couple eight control rods 36 to a drive assembly. Each of the rods 36 has a head member 121 which is affixed to its upper end. The coupling head 121 is similar to the coupling head 35 previously described in that the head 121 is provided with a reduced neck 40, upper and lower engagement faces 42 and 44 and a separation face 46. Additionally, however, the head 121 is provided with a plurality of longitudinal slots 132 in its upper end so that the tip of the head may be compressed radially inward for a purpose to be explained hereinbelow. The head member 121 also is provided with two diametrically opposed longitudinal openings 123 in the sides thereof through which extends a pin 122 which is affixed to a sleeve 124 surrounding a portion of the head member 121. The sleeve 124 is slidable along the head member 121 by virtue of the fact that the pin 122 is vertically slidable in the openings 123. The sleeve 124 is biased downwardly by means of a coiled compression spring 126 positioned within a chamber 130 in the lower end of the head member 121. The lower end of the spring 126 acts on a plate 128 affixed to the pin 122. As can be seen from FIG. 8, the sleeve 124 rests upon the upper end of the alignment post 118 and accordingly, due to the biasing force of the spring 126 the control element 36 is positioned slightly above its lowermost position. The function of the spring 126 is to insure that the coupling of each of the control rod fingers 36 is not effected by variation in elevation between fuel assemblies or variation in length between control element fingers.

A longitudinally extending gripping means 48 and gripper operating member 68 substantially identical to those previously described is provided for each of the control rods 36 and coupling heads 121. The elongated gripping means 48 each comprise a tubular cylinder 49 having a plurality of longitudinal slots 50 which divide the tubular cylinder into a plurality of flexible gripping fingers 52. In the embodiment shown in FIG. 8 there are four longitudinal slots and four flexible fingers 52 for each cylinder 48. Each of the fingers 52 at its lower end is provided on its inner surface with mutually opposed and obliquely disposed upper and lower gripping surfaces 54, 56 separated by surface 58, and on its outer surface with a downwardly facing obliquely disposed cam face 60. The gripper operating members 68 each comprise a tubular sleeve 69 having at its lowermost tip a disengaging cam surface 78 which engages a complementary cam face 79 on a coupling head 121. For each individual gripper device 120, the upper end of the tubular cylinder 49 is fixed to a connecting cylinder 136 which in turn is fixed to a rod 138 which extends longitudinally upward and is supported by a common upper yoke 140. The longitudinal position of the rod 138 relative to the yoke 140 is adjustable by means of a nut 141. The yoke 140 has an upwardly extending hollow tubular portion 142 with a threaded inner surface at its upper end. Each of the eight tubular sleeves 69 of the master gripper device 119 is affixed to a hollow tubular connecting member 144 which surrounds the rod 138. The tubular connecting member 144 extends upward and is connected to a common yoke 146. The lower yoke 146 has an upwardly extending rod 72 affixed thereto which extends upward through the tubular portion of the upper yoke 140. In this manner the two yokes 140, 146 are able to support a plurality of individual gripper devices 120. In the particular embodiment shown, this plurality is eight. The upper half of the master gripper device 119 is identical to that shown in FIGS. 5-7 in which the tubular cylinder 84 is threaded into engagement with the upper end of the hollow tubular portion 142.

The operation of the gripper device 120 is as follows. Initially, the two yokes 140, 146 are longitudinally spaced and lowered as a unit with the gripper means 48 and gripper operating members 68 telescoping into the tubes 116 of the guide structure 26 until the disengaging cam surfaces 78 of the sleeves 69 engage the cam faces 79 of each of the coupling heads 121 of the control rods 36. This is shown in FIG. 8. The upper yoke 140 is then lowered relative to the lower yoke 146, so that the cam faces 60 of each tubular cylinder 49 engage the cam surfaces 76 of each sleeve 69 thereby forcing the fingers 52 of each cylinder 49 into gripping engagement with the coupling heads 121. This is shown in FIG. 9. As is apparent, the longitudinal position of the rod 138 relative to the yoke 140 can be varied so that when the two yokes 140 and 146 are touching, the gripper operating member 68 is continuously applying an obliquely oriented force to the gripper fingers 52 of each of the tubular cylinders 49. The two yokes 140, 146 and thus the gripping means 48 and the gripper operating member 68 can be locked in this engagement position in the same manner as previously described.

As can be appreciated, it is impractical to adjust the relative heights of the individual gripping means 48 after they have been initially set in place due to problems of access and radiation. Since any variation in height could result in an improper gripping position, it is desirable to provide a means to insure that this variation in height will not cause adverse effects. Accordingly, each of the coupling heads 121 of the control element fingers 36 are provided with a plurality of slots 132 at their upper ends. The relative locations of the two yokes 140 and 146 are initially set by means of a ball gage (not shown) which has a slightly smaller diameter than the nominal diameter of the control element assembly fingertips. The slots 132 in the coupling head 121 thus insure that a tight coupling will be made regardless of any dimensional variations between the diameters of the coupling head 121, the lengths of the control element fingers 36 and the relative longitudinal positions of the gripping means 48 and the gripper operating members 68.

Figure 10:
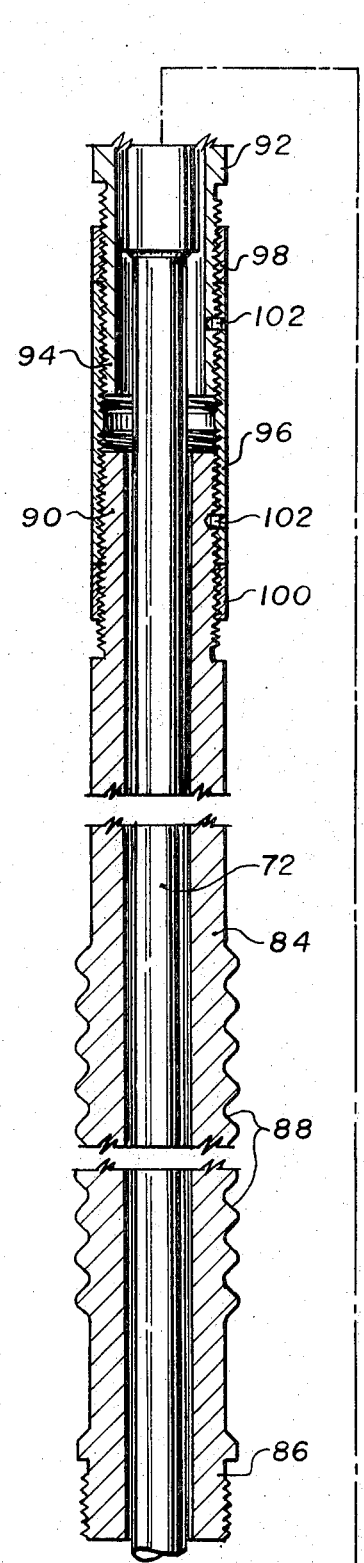
FIGS. 10, 11 and 12 are views similar to FIGS. 5, 6 and 7 showing an alternative arrangement for the locking device.
Figure 11:
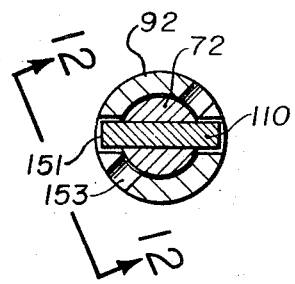
Figure 12:
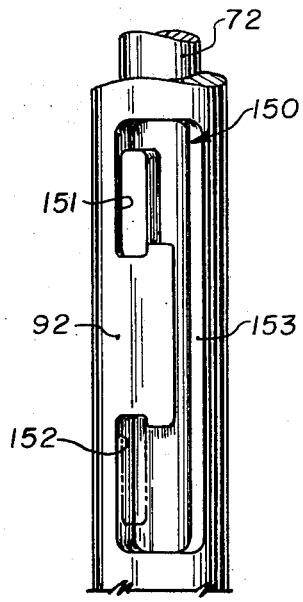

FIGS. 10, 11 and 12 show an alternative arrangement for the upper portion of the master gripper device 119 which may be used to insure the relative longitudinal positions between the gripper operating member 68 and the gripping means 48 at both the upper and lower positions. This arrangement is similar to that shown in FIG. 5 in that there are two cylindrical tubes 84, 92 joined together by a sleeve 96. At the upper end of the tube 92 in FIG. 10, however, there are provided two diametrically opposed slots 150 each of which has a longitudinal shank portion 153 and two hooked return portions 151 and 152 at both the upper and lower ends of the shank portion 153. When the pin 110 of the rod 72 is in the upper hooked return portion 151, the rod 72 is again stretched as previously described, thereby insuring that the gripper operating members 68 are in their uppermost position relative to the gripping means 48. When the pin 110 is in the lower hooked portion 152 it will insure that the gripper operating members 68 are in the lowermost longitudinal position relative to the gripping means 48, the pin being held in place at such an elevation by the weight of the cylindrical tubes 92 and 84. This arrangement is particularly advantageous for use with the alternative master gripping device 119 shown in FIGS. 8 and 9 where it is necessary, in initially inserting the gripping device 119 in the guide assembly 26, to insure that the two yokes 140 and 146 remain longitudinally spaced. As before, the pin 110 is held in position within the hooked return portions 151, 152 as a result of the fact that the rod does not experience as great a torque in these portions as it would otherwise experience in the longitudinal shank portion 153.

While these preferred embodiments of the invention have been shown and described, it will be understood that they are merely illustrative and that changes may be made without departing from the scope of the invention as claimed.

What is claimed is:

1. A gripper device for remotely coupling a linearly moving drive member to a member to be driven, said gripper device comprising:
longitudinally extending gripping means movable into and out of gripping engagement with the member to be driven, said gripping means having mutually opposed, longitudinally spaced upper and lower gripping surfaces defined therealong, said upper and lower gripping surfaces each being obliquely disposed relative to the longitudinal direction and being the sole surfaces of said gripping means to engage the member to be driven;
a gripper support member supporting said gripping means and connected to the drive member;
a gripper operating member relatively longitudinally movable between a first position and a second position relative to said gripping means, said gripper operating member when in said first position continuously applying an obliquely oriented force relative to said gripping means to force said gripping means into gripping engagement with the member to be driven, and said gripper operating member when in said second position releasing the obliquely oriented force;
means for moving said gripper operating member between said first and second positions; and
means for locking said gripper operating member in said first position.

2. The gripper device of claim 1 wherein said gripper support member comprises a tubular member connected to and extending upward from said gripping means;
wherein said means for moving said gripper operating member comprises a rod extending axially upward through and relatively longitudinally movable relative to said tubular member, said rod being connected at its lower end to said gripper operating member so that relative longitudinal movement of said rod within said tubular member causes similar relative longitudinal movement of said gripper operating member; and
wherein said locking means comprises:
a slot in said tubular member, said slot having a longitudinal shank portion and a hooked return portion at the upper end of said longitudinal shank portion, and
a pin fixed to said rod and extending outwardly into said slot, said pin being oriented relative to said slot such that said pin is positioned in the lower end of said longitudinal shank portion of said slot when said gripper operating member is in said second position and said pin is positioned in said hooked return portion of said slot when said gripper operating member is in said first position, and further such that said rod is placed in tension when said pin is in said hooked return position of said slot.

3. The gripper device of claim 2 wherein said gripping means comprises a plurality of longitudinally extending radially flexible gripping fingers arranged about a longitudinal axis to provide inwardly and outwardly facing surfaces at one end, said flexible fingers having defined on one of said inwardly and outwardly facing surfaces said upper and lower gripping surfaces and having defined on the other of said inwardly and outwardly facing surfaces cam faces obliquely oriented relative to said longitudinal axis; and
wherein said gripper operating member comprises a longitudinally extending member disposed coaxially with said plurality of gripping fingers, said member having defined thereon a complementary cam surface for engaging said cam faces upon longitudinal movement of said coaxial member upward relative to said flexible fingers.

4. The gripper device of claim 3 wherein said upper and lower gripping surfaces are defined on said inwardly facing surfaces of said flexible fingers and said cam faces are defined on said outwardly facing surfaces; and
wherein said longitudinally extending member is a tubular sleeve surrounding said flexible fingers, said tubular sleeve having an obliquely oriented complementary cam surface on its inner surface.

5. The gripper device of claim 4 wherein said plurality of flexible fingers are cylindrically arranged about said longitudinal axis;
wherein said tubular sleeve is a cylindrical tube having a first portion of a first inner diameter which is greater than the mean diameter of said cylindrically arranged flexible fingers and a second portion of a second inner diameter which is smaller than said first diameter; and
wherein said complementary cam surface is a shoulder defined on the inner surface of said cylindrical tube between said first and second portions, said shoulder being obliquely oriented upward relative to said longitudinal axis so that upon upward movement of said cylindrical tube relative to said flexible fingers, said shoulder engages said cam faces of said flexible fingers to force said flexible fingers inwardly to engage the member to be driven.

6. In a control element drive assembly for a nuclear reactor, the combination comprising:
at least one longitudinally extending control element vertically movable within said nuclear reactor;
a coupling head connected at one end to said control element, said coupling head having upper and lower engagement faces each of which is obliquely disposed relative to the longitudinal direction;
a drive means spaced from said control element for driving said control element into and out of the reactor; and
a coupling assembly connected to said drive means for coupling said coupling head to said drive means, said coupling assembly comprising:
a. longitudinally extending gripping means having mutually opposed, longitudinally spaced upper and lower gripping surfaces defined therealong for releasably engaging said upper and lower engagement faces respectively of said coupling head, said upper and lower gripping surfaces each being obliquely disposed relative to the longitudinal direction and being the sole surfaces of said gripping means to engage said coupling head, b. a gripper support member supporting said gripping means and connected to said drive means, c. a gripper operating member relatively longitudinally movable between a first position and a second position relative to said gripping means, said gripper operating member when in said first position continuously applying an obliquely oriented force relative to said gripping means to force said upper and lower gripping surfaces of said gripping means into engagement with said upper and lower engagement faces respectively of said coupling member, and said gripper operating member when in said second position releasing the obliquely oriented force, d. means for moving said gripper operating member between said first and second positions, and e. means for locking said gripper operating member in said first position.

7. The combination of claim 6 wherein there are a plurality of said longitudinally extending control elements each of which is vertically movable within the nuclear reactor and each of which is laterally spaced from one another;

wherein there are a plurality of said coupling heads connected to said plurality of control elements; and wherein said coupling assembly further comprises:

a plurality of said longitudinally extending gripping means each of which is supported by said gripper support member;

a plurality of said gripper operating members each of which is relatively longitudinally movable between said first position and said second position relative to said gripping means;

said means for moving said gripper operating member includes means for moving said plurality of gripper operating members; and said means for locking said gripper operating member in said first position includes means for locking said plurality of gripper operating members in said first position.

8. The combination of claim 7 wherein said gripper support member comprises a first yoke positioned above and connected to each of said gripping means and a longitudinally extending tubular member connected to said first yoke and extending upward therefrom, said tubular member being connected above said first yoke to said drive means; and wherein said means for moving said plurality of gripper operating members comprises a second yoke positioned above and connected to each of said gripper operating members, said second yoke being spaced from said first yoke, and a rod connected to said second yoke and extending upward through said tubular member, said rod being relatively longitudinally movable relative to said tubular member so that relative longitudinal movement therebetween causes similar relative longitudinal movement between said gripper operating members and said gripping means.

9. The combination of claim 8 wherein said means for locking said plurality of gripper operating members in said first position includes means for locking said gripper operating members in said second position.

10. The combination of claim 9 wherein said means for locking said plurality of gripping means in said first and said second positions comprises:

a slot in said tubular member, said slot having a longitudinal shank portion, a first hooked return portion at the upper end of said longitudinal shank portion and a second hooked return portion at the lower end of said longitudinal shank portion; and a pin fixed to said rod and extending outwardly into said slot, said pin being oriented relative to said slot such that said pin is positioned in said second hooked return portion of said slot when said gripper operating members are in said second position, and said pin is in said first hooked return portion of said slot when said gripper operating members are in said first position, and further such that said rod is placed in tension when said pin is in said first hooked return portion of said slot, said rod is placed in a first amount of torsion when said pin is in either of said hooked return portions of said slot, and said rod is placed in a second amount of torsion greater than said first amount when said pin is in said longitudinal shank portion of said slot.

11. The combination of claim 8 wherein each of said gripping means comprises a plurality of longitudinally extending radially flexible gripping fingers cylindrically arranged about a longitudinal axis to provide inwardly and outwardly facing surfaces at one end, said flexible fingers having said upper and lower gripping surfaces defined on said inwardly facing surfaces and cam faces defined on said outwardly facing surfaces, said cam faces being obliquely oriented relative to said longitudinal axis;

and wherein each of said gripper operating members comprises a longitudinally extending tubular sleeve coaxially disposed with and surrounding said flexible fingers, said tubular sleeve having defined on its inner surface an obliquely oriented complementary cam surface for engaging said cam faces upon longitudinal movement of said sleeve upward relative to said flexible fingers.

12. The combination of claim 11 wherein each of said coupling heads is longitudinally movable relative to its respective control element and wherein there are provided means for biasing each of said movable coupling heads away from the end of its respective control element.

13. The combination of claim 12 wherein each of said coupling heads have a plurality of longitudinally extending slots in their uppermost end to provide radial flexibility of said coupling heads at said uppermost ends.

* * * * *